United States Patent
Cho et al.

(10) Patent No.: US 11,702,870 B2
(45) Date of Patent: Jul. 18, 2023

(54) HOOD LATCH DEVICE FOR VEHICLE

(71) Applicants: Hyundai Motor Company, Seoul (KR); Kia Motors Corporation, Seoul (KR)

(72) Inventors: Hyeon Woo Cho, Gyeonggi-do (KR); Sang Il Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1221 days.

(21) Appl. No.: 16/169,650

(22) Filed: Oct. 24, 2018

(65) Prior Publication Data

US 2020/0071971 A1 Mar. 5, 2020

(30) Foreign Application Priority Data

Aug. 31, 2018 (KR) .................. 10-2018-0103907

(51) Int. Cl.
*B62D 25/12* (2006.01)
*E05B 83/24* (2014.01)

(52) U.S. Cl.
CPC .............. *E05B 83/24* (2013.01); *B62D 25/12* (2013.01)

(58) Field of Classification Search
CPC ........ E05B 83/24; E05B 85/00; E05B 83/243; E05B 79/10; E05B 81/22; E05B 85/20; B62D 25/12
See application file for complete search history.

(56) References Cited

U.S. PATENT DOCUMENTS

| | | | | |
|---|---|---|---|---|
| 2,830,836 A | * | 4/1958 | Sigel | E05B 83/24 292/11 |
| 4,756,562 A | * | 7/1988 | Foster | E05B 83/24 292/28 |
| 6,422,616 B1 | * | 7/2002 | Wortmann | E05B 83/24 292/216 |
| 10,584,521 B2 | * | 3/2020 | Nieto Avila | B62D 25/12 |
| 2014/0138961 A1 | | 5/2014 | Hwang | |
| 2017/0159330 A1 | | 6/2017 | Schiffer | |

FOREIGN PATENT DOCUMENTS

| | | |
|---|---|---|
| CN | 101193772 A | 6/2008 |
| CN | 202389479 U | 8/2012 |
| CN | 103590675 A | 2/2014 |
| CN | 204139790 U | 2/2015 |
| DE | 102017001559 A1 | 8/2017 |
| KR | 2011-0096304 A | 8/2011 |

* cited by examiner

*Primary Examiner* — Kristina R Fulton
*Assistant Examiner* — Thomas L Neubauer
(74) *Attorney, Agent, or Firm* — Fox Rothschild LLP

(57) ABSTRACT

A hood latch device for a vehicle is provided. The hood latch device includes a base that is secured to a vehicle body member. In addition, the hood latch device further includes a safety hook, a pawl and a claw, each of which is rotatably coupled to the base. Further, a first spring is coupled to a safety hook and to one end of a pawl that protrudes forward from the base. A second spring is coupled to the base and to the claw.

11 Claims, 7 Drawing Sheets

HOOD LATCH DEVICE FOR VEHICLE

CROSS-REFERENCE TO RELATED APPLICATION

This application claims the priority benefit of Korean Patent Application No. 10-2018-0103907, filed on Aug. 31, 2018, the disclosure of which is incorporated herein by reference in its entirety.

BACKGROUND

1. Field of the Invention

The present invention relates to a hood latch device for a vehicle, and more particularly to a hood latch device for a vehicle, which increases the distance to which a striker is raised when a locked state is released.

2. Description of the Related Art

The engine compartment of a vehicle is typically sealed by a hood panel and is opened through rotation of the hood panel by a hinge device when necessary, for example, during maintenance. The state in which the engine compartment is closed by the hood panel is maintained by interlocking of a striker and a hood latch. Typically, the striker is coupled to the hood panel, and the hood latch is coupled to a member (e.g., a front end module) of the vehicle body.

When unlocking the hood latch, the greater the distance to which the striker is raised, the easier it is for the user to lift the hood panel by rotating the hood panel. Thus, the distance to which the striker is raised is a factor in determining the quality of the hood latch. In addition, a cable is connected to a pawl to unlock the hood latch. Allowing the user to assemble the latch device to a member (e.g., a front end module) of the vehicle body prior to connecting a cable to a pawl will improve working efficiency.

The information disclosed in this section is merely for enhancement of understanding of the general background of the invention and should not be taken as an acknowledgement or any form of suggestion that this information forms the prior art already known to a person skilled in the art.

SUMMARY

The present invention provides a hood latch device for a vehicle which may increase the distance to which a striker is raised, thereby improving the quality of the product. Another object of the present invention is to provide a hood latch device for a vehicle, in which a hood latch may be first assembled to a vehicle body member (e.g., a front end module), and subsequently, a cable may be connected to a pawl during the assembly process, thereby substantially improving convenience in connection of the cable. Still another object of the present invention is to provide a hood latch device for a vehicle, which may decrease the number of parts, thereby decreasing the weight and manufacturing costs of the product.

In accordance with the present invention, the above and other objects may be accomplished by the provision of a hood latch device for a vehicle that may include a base secured to a vehicle body member; a safety hook, a pawl and a claw, each of which is rotatably coupled to the base; a first spring coupled to the safety hook and to the pawl; and a second spring coupled to one side of the base and to the claw. Further, one end of the pawl may penetrate the base and may protrude forward from the base. The one end of the pawl, protruding forward from the base, may be connected with a cable. In addition, the one end of the pawl, protruding forward from the base, may be coupled with a first end of the first spring.

The base may include a guide aperture cut along a rotation path of the pawl, and one end of the pawl may protrude forward from the base through the guide aperture formed in the base. The first spring may be a tension spring that provides an elastic force to the safety hook and the pawl to maintain the safety hook and the pawl in contact with each other in a locked state. The second spring may be a tension spring coupled to one side of the base and to the claw while being extended in length in a transverse direction. When the locked state is released by rotation of the pawl, the claw may be rotated by a restoring force of the second spring, and a striker may be raised.

The safety hook may be coupled to the front surface of the base via a first pin to be rotatable relative to the base. The pawl and the claw may be coupled to the rear surface of the base via a second pin and a third pin, respectively, to be rotatable relative to the base and to be in contact with each other. One end of the pawl may protrude forward from the base through the base and may be disposed at a first side of the first pin. A first end of the first spring may be coupled to the one end of the pawl that is disposed at the first side of the first pin. A second end of the first spring may be coupled to a predetermined portion of the safety hook that is disposed at a second side of the first pin. The second end of the first spring, coupled to the safety hook, may be disposed at a higher position than the first end of the first spring, coupled to the pawl, with respect to the first pin.

The base may include a first locking slot into which the striker is inserted. The safety hook may include a hook portion for opening or closing an entrance of the first locking slot in response to rotation of the safety hook. The pawl may include a locking protrusion that protrudes toward the claw. The claw may include a second locking slot into which the striker is inserted and a locking recess into which the locking protrusion of the pawl is inserted. The second pin and the third pin may be disposed above the first pin to be spaced apart from each other in the transverse direction. The second spring may be disposed above the first pin and below the second and third pins. A first end of the second spring may be coupled to a portion of the base that is disposed outside the second pin and a second end of the second spring may be coupled to a portion of the claw that is disposed outside the third pin while the second spring is extended in length in the transverse direction.

When the locking protrusion of the pawl is inserted into the locking recess in the claw, the striker may be inserted both into the first locking slot and into the second locking slot to maintain a locked state, and the second spring may be coupled to one side of the base and to the claw while being extended in length in the transverse direction to store an elastic force. When the locking protrusion is separated from the locking recess in the claw by rotation of the pawl and the locked state is released, the claw may be rotated by a restoring force of the second spring, and the striker may be raised and released from the second locking slot.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Reference will now be made in detail to the exemplary embodiments of the present invention, examples of which are illustrated in the accompanying drawings. Wherever possible, the same reference numbers will be used throughout the drawings to refer to the same or like parts.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

A hood latch device for a vehicle according to an exemplary embodiment of the present invention, as illustrated in FIGS. 1 to 7, may include a base 10 secured to a vehicle body member 1 (e.g., a front end module); a safety hook 20, a pawl 30 and a claw 40 rotatably coupled to the base 10; a first spring 50 coupled at both ends thereof to the safety hook 20 and to the pawl 30; and a second spring 60 coupled at both ends thereof to one side of the base 10 and to the claw 40.

The base 10 may be formed as a plate using a steel material. The base 10 may include a first locking slot 11, which is elongated to be open upwards to allow a striker 2 to be inserted thereinto, and a guide aperture 12, which is cut along the rotation path of the pawl 30. The striker 2 may be coupled to a hood panel, which functions to open or close the engine compartment. The safety hook 20 may be coupled to the front surface of the base 10 via a first pin 70 to be rotatable relative to the base 10. The safety hook 20 may include a hook portion 21, which opens or closes the entrance of the first locking slot 11 in the base 10 in response to rotation of the safety hook 20, and a lever portion 22, which is operated by a user to rotate the safety hook 20.

The pawl 30 and the claw 40 may be coupled to the rear surface of the base 10 via a second pin 80 and a third pin 90, respectively, to be rotatable relative to the base 10. The pawl 30 and the claw 40 may be mounted to be in contact with each other (e.g., abut) by a locking projection and a locking recess, which will be described later. The upper end portion of the pawl 30 may be rotatably coupled to the base 10 via the second pin 80. One end 31 of the pawl 30, which corresponds to the lower end portion thereof, may penetrate the base 10 to protrude forward from the base 10. In other words, the one end 31 of the pawl 30, which corresponds to the lower end portion thereof, may penetrate the guide aperture 12 formed in the base 10, and may protrude forward from the base 10. When the pawl 30 rotates about the second pin 80, the one end 31 of the pawl 30, which corresponds to the lower end portion thereof, may move along the guide aperture 12.

The one end 31 of the pawl 30, which protrudes forward from the base 10, may include a first protrusion 32 and a second protrusion 33. The first protrusion 32 and the second protrusion 33 may be connected with one end of a cable 100 and a first end of the first spring 50, respectively. In addition, the pawl 30 may include a locking protrusion 34, which protrudes toward the claw 40. The claw 40 may include a second locking slot 41, which is elongated to be open laterally to allow the striker 2 to be inserted thereinto, and a locking recess 42, which may be formed below the second locking slot 41 to allow the locking protrusion 34 of the pawl 30 to be inserted thereinto. The pawl 30 and the claw 40 may be mounted to be in contact with each other due to the contact between the locking protrusion 34 and the locking recess 42.

The first spring 50 may be a tension spring, which provides an elastic force to the safety hook 20 and the pawl 30 to maintain the safety hook 20 and the pawl 30 to be in contact with each other at normal times (e.g., when the hood is closed). In other words, one end of the pawl 30 may protrude forward from the base 10 through the base 10, and may be disposed at a first side (the right side, referring to FIG. 3) of the first pin 70. A first end of the first spring 50 may be coupled to the one end of the pawl 30, which is disposed at the first side of the first pin 70, and a second end of the first spring 50 may be coupled to a side portion of the safety hook 20, which is disposed at a second side (the left side, referring to FIG. 3) of the first pin 70. The second end (the left end) of the first spring 50, which is coupled to the safety hook 20, may be disposed at a higher position than the first end (the right end) of the first spring 50, which is coupled to the pawl 30, with respect to the first pin 70.

The second spring 60 may be a tension spring, which is coupled at both ends thereof to one side of the base 10 and to the claw 40 while being extended in the transverse direction. When the locked state is released by a rotation of the pawl 30, the claw 40 may be rotated by a restoring force of the second spring 60, and the striker 2 may be raised.

Figure 4:
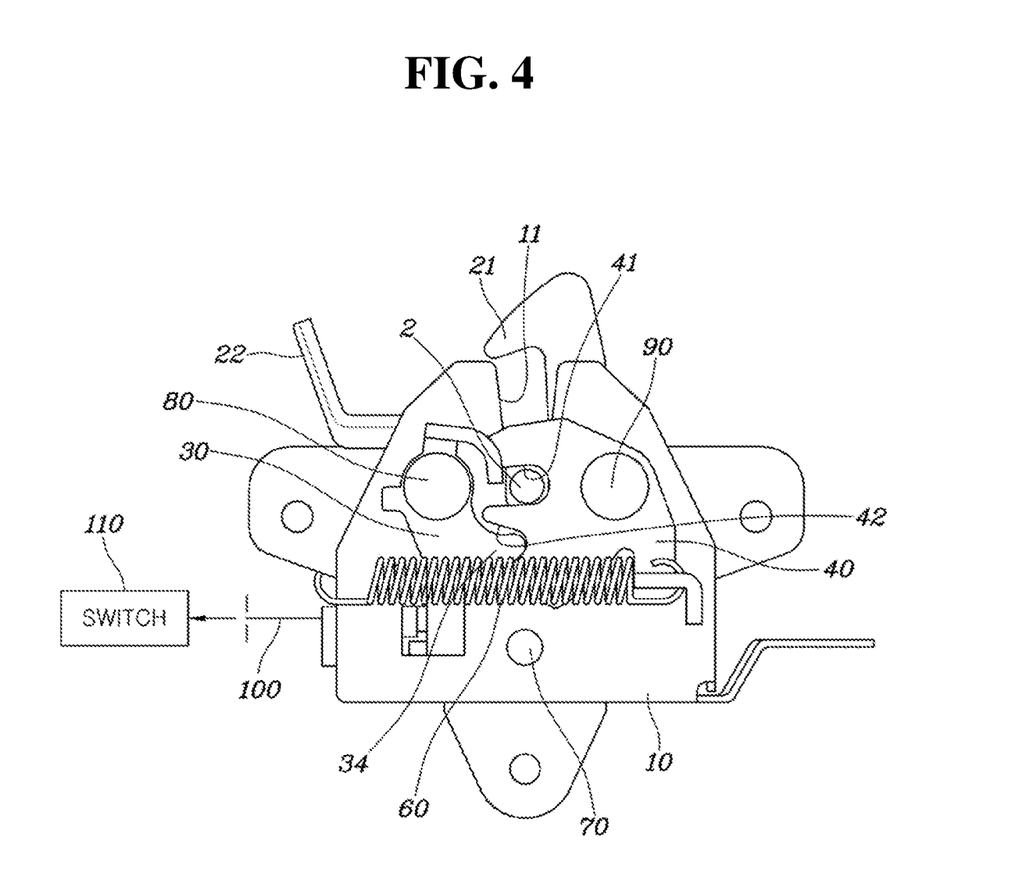

As illustrated in FIG. 4, the second pin 80 and the third pin 90 may be disposed above the first pin 70 to be spaced apart from each other in the transverse direction. The second spring 60 may be disposed between the first pin 70 and the second and third pins 80 and 90, i.e., above the first pin 70 and below the second and third pins 80 and 90. A first end (the left end) of the second spring 60 may be coupled to a side portion of the base 10, which is disposed outside the second pin 80, and a second end (the right end) of the second spring 60 may be coupled to a portion of the claw 40, which is disposed outside the third pin 90, while the second spring 60 is extended in the transverse direction.

Figure 7:
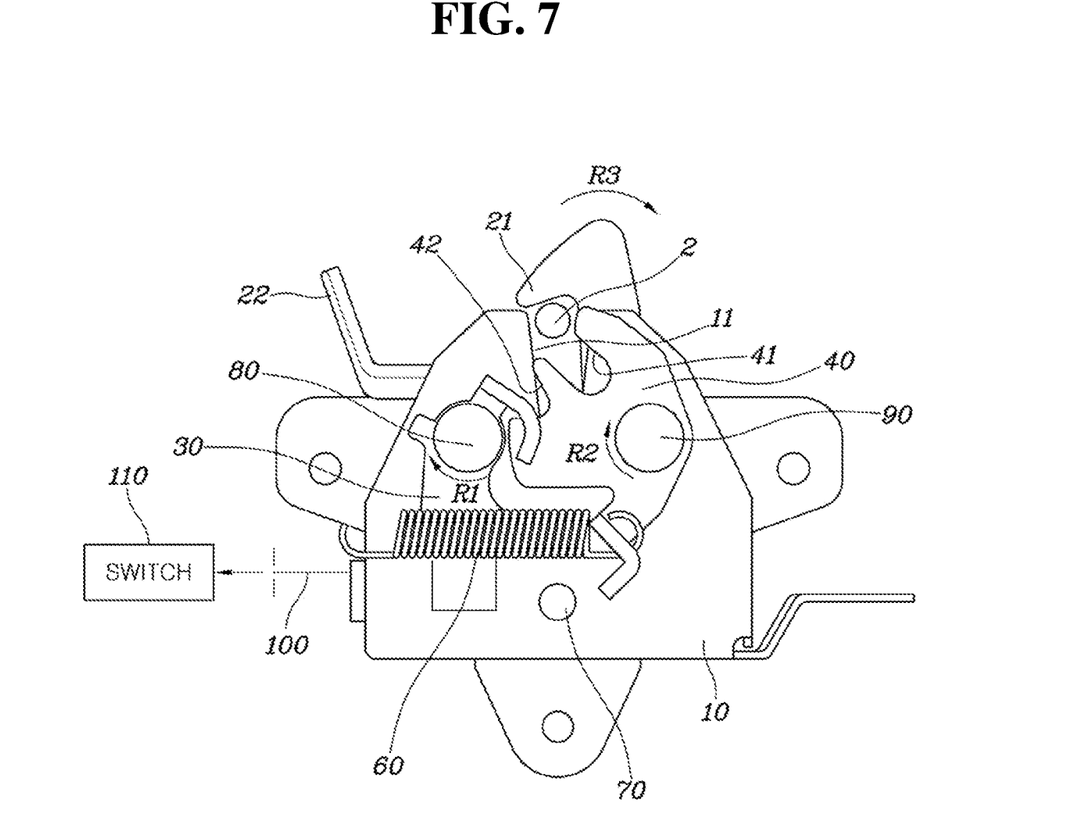
FIG. 7 is a view of the state in which a claw is rotated by the elastic force of a second spring due to the rotation of the pawl according to an exemplary embodiment of the present invention.

Accordingly, as illustrated in FIG. 4, when the locking protrusion 34 of the pawl 30 is inserted into the locking recess 42 in the claw 40, the striker 2 may be inserted both into the first locking slot 11 and into the second locking slot 41, and therefore the locked state may be maintained. At the same time, the second spring 60, which is coupled to one side of the base 10 and to the claw 40 while being extended in the transverse direction, may store an elastic force. As illustrated in FIG. 7, when the locking protrusion 34 is separated from the locking recess 42 in the claw 40 by rotation of the pawl 30 and the locked state is thus released, the claw 40 may be rotated by the restoring force of the second spring 60, and accordingly, the striker 2 may be released from the second locking slot 41 and may be raised.

Figure 1:
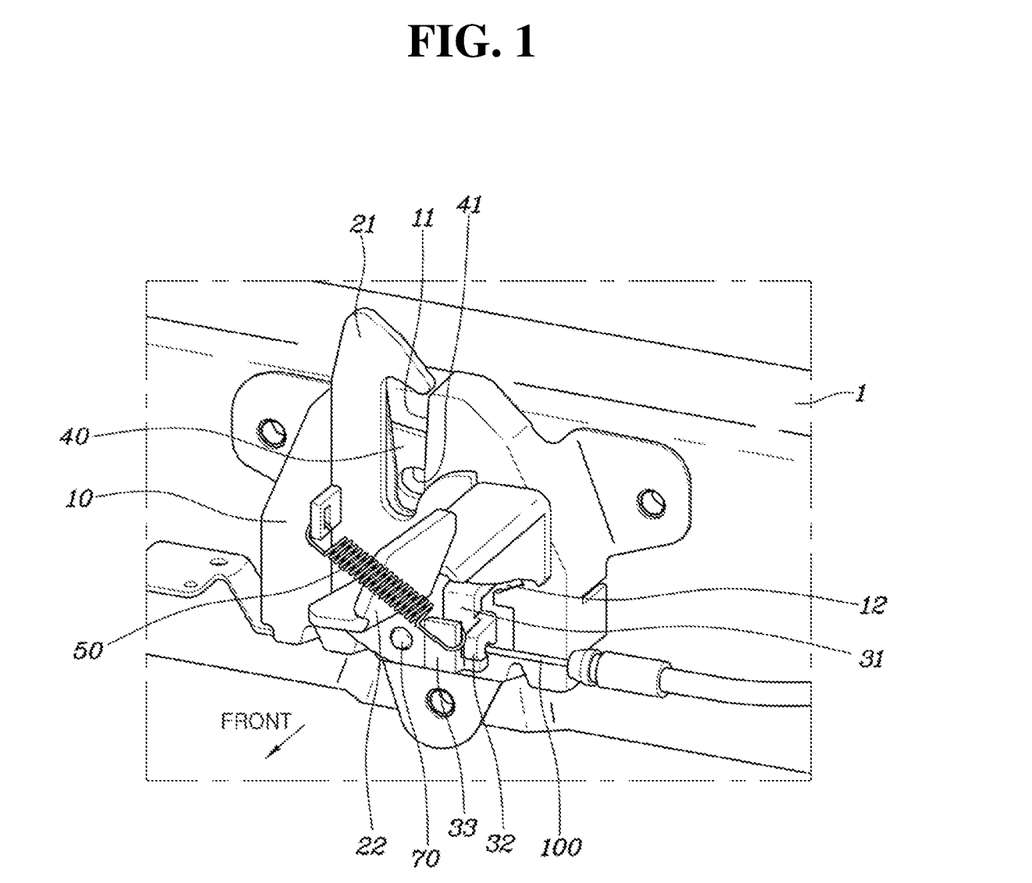
FIG. 1 is a view illustrating the state in which a hood latch device for a vehicle according to an exemplary embodiment of the present invention is coupled to a member of the vehicle body.
Figure 2:
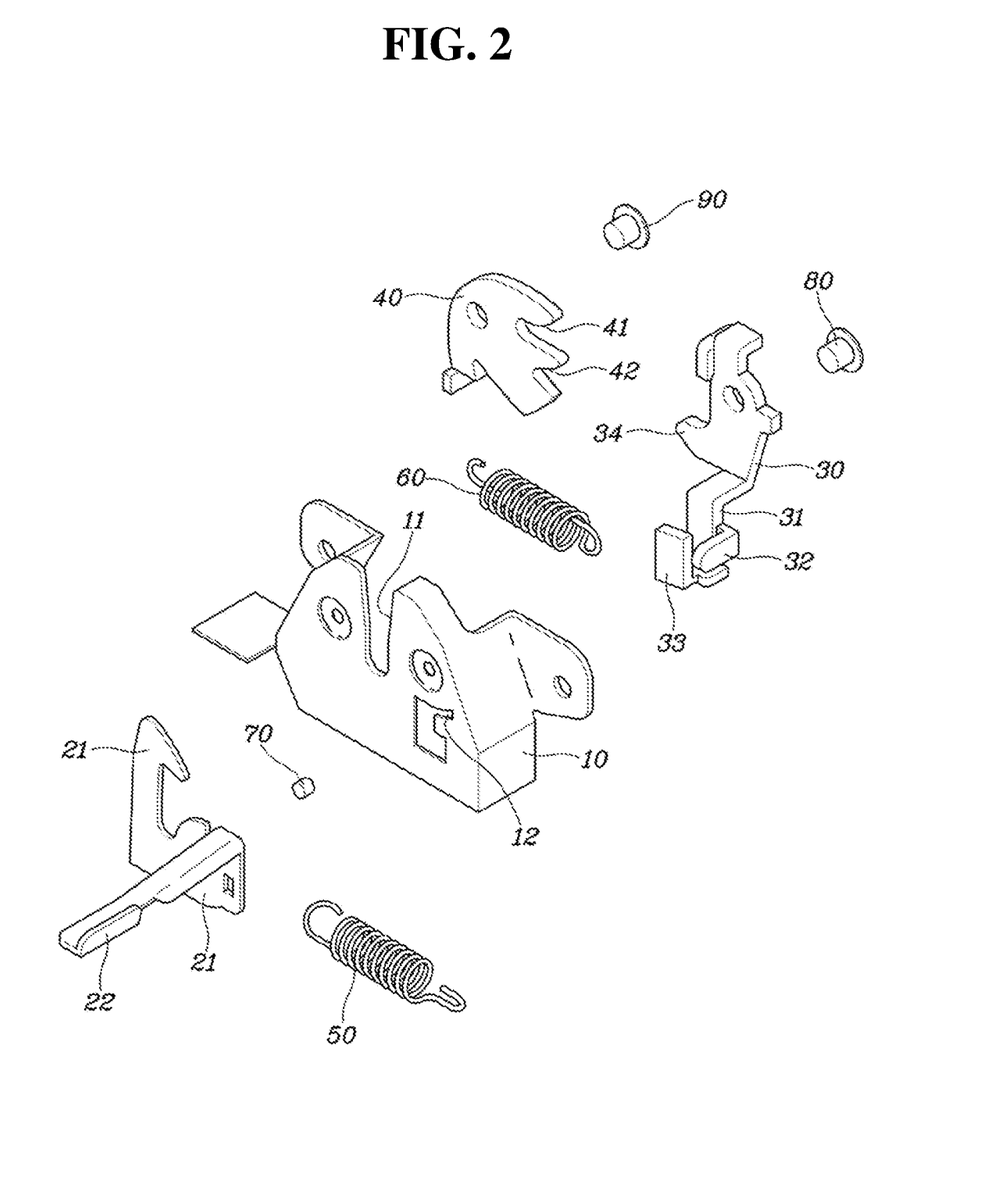
FIG. 2 is detailed perspective view of the hood latch device for a vehicle according to an exemplary embodiment of the present invention.
Figure 3:
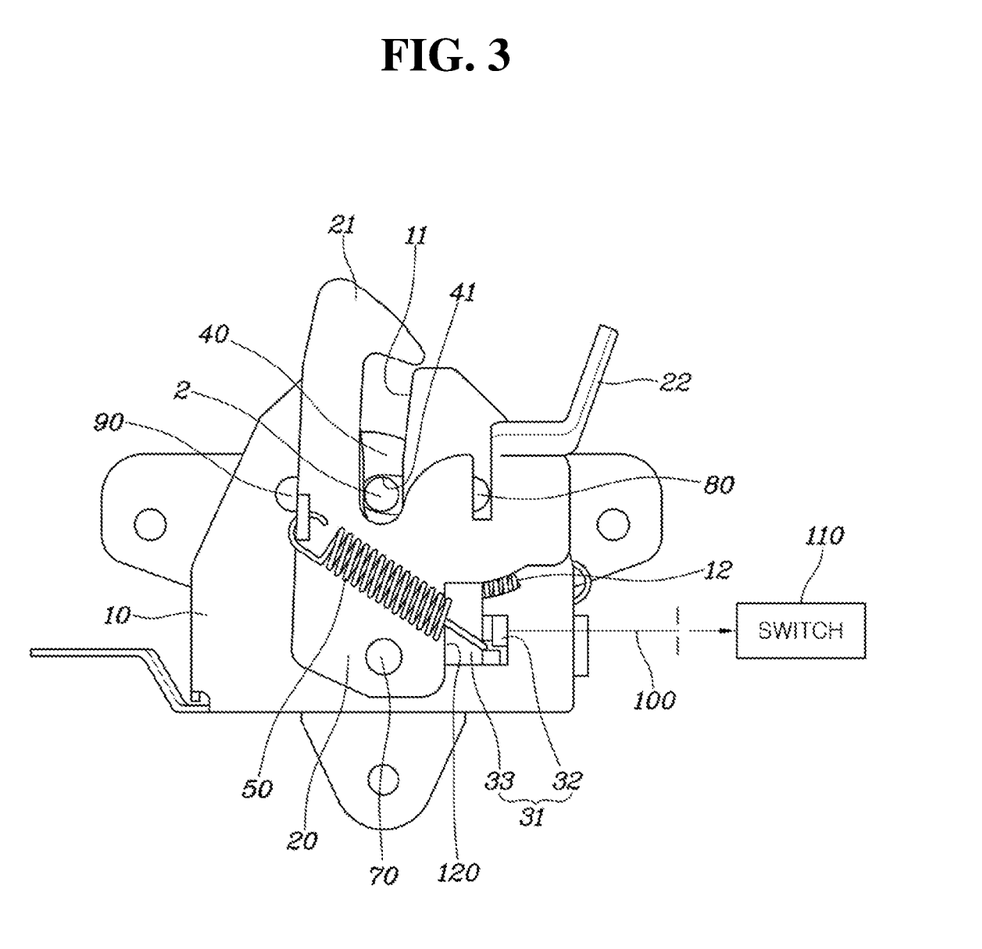
FIGS. 3 and 4 are a front view and a rear view, respectively, of the hood latch device for a vehicle according to an exemplary embodiment of the present invention.
Figure 5:
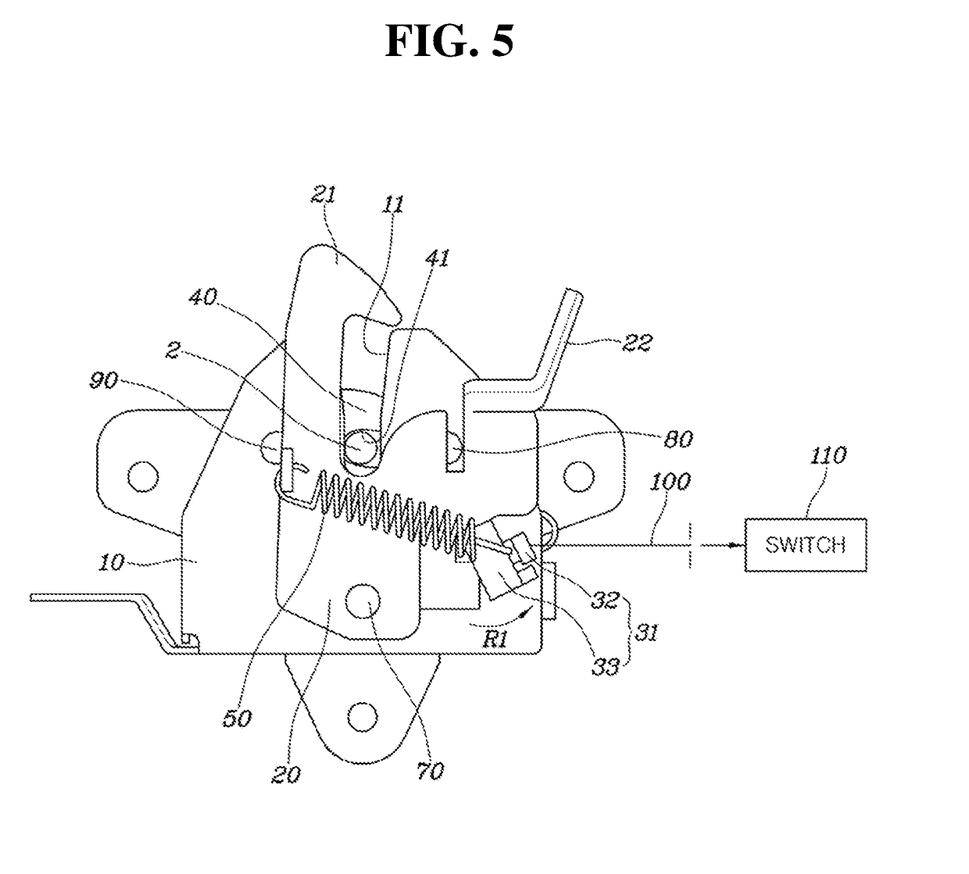
FIGS. 5 and 6 are a front view and a rear view, respectively, of the state in which a pawl is rotated by the operation of a cable according to an exemplary embodiment of the present invention.
Figure 6:
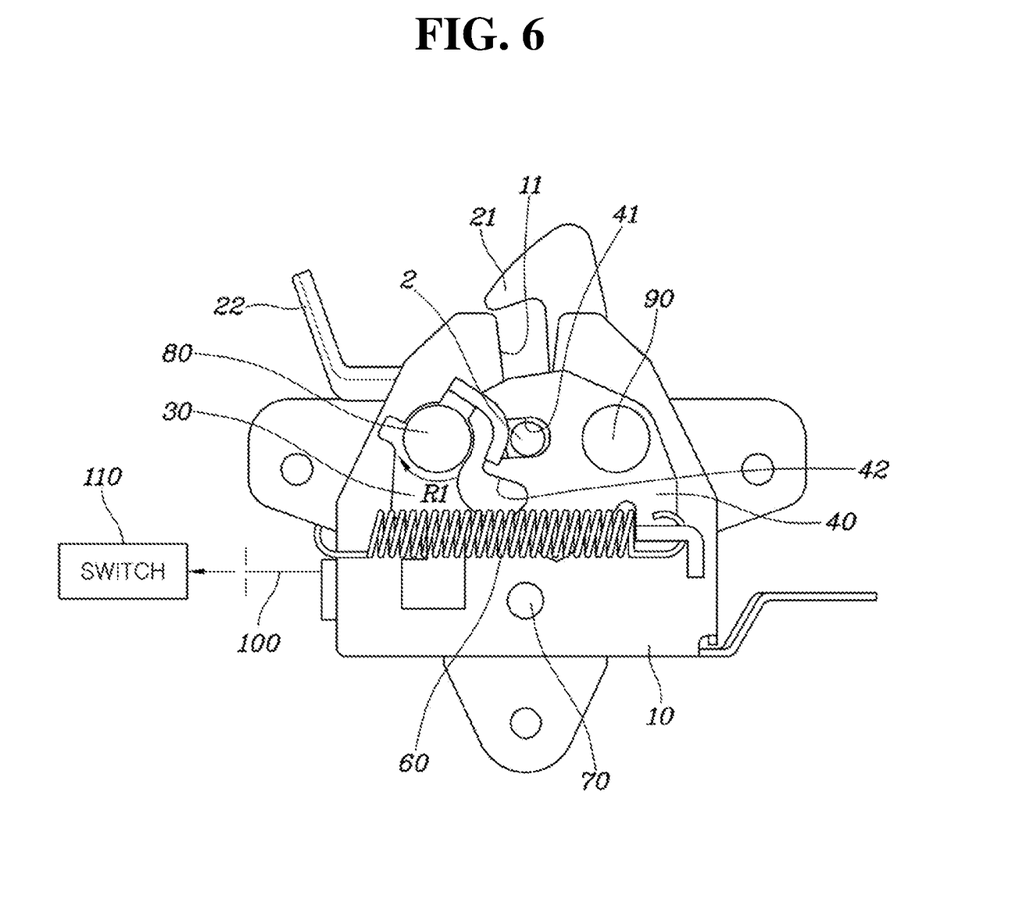

Hereinafter, the operation of the exemplary embodiment according to the present invention will be described in detail. FIGS. 3 and 4 are views of the locked state in which the striker 2 is inserted both into the first locking slot 11 in the base 10 and into the second locking slot 41 in the claw 40. FIGS. 5 and 6 are views of the state in which the pawl 30 is rotated about the second pin 80 by the pulling operation of the cable 100 due to an operation of a switch 110 provided in the interior of the vehicle. FIG. 7 is a view of the state in which the claw 40 is rotated as the locked state is released by the rotation of the pawl 30 and in which the striker 2 is raised due to the rotation of the claw 40.

In the locked state illustrated in FIGS. 3 and 4, the safety hook 20 may be maintained in contact with the one end 31 of the pawl 30. Accordingly, rotation of the safety hook 20 about the first pin 70 may be suppressed, and thus the hook portion 21 of the safety hook 20 may block the entrance of the first locking slot 11. In other words, while the hood panel is closed, one side surface of the safety hook 20 and one side surface of the one end 31 of the pawl 30, which protrudes forward from the base 10, may abut each other to form a contact surface, which is denoted by reference numeral 120 in FIG. 3. Further, the first spring 50 may pull the one end 31 of the pawl 30 toward the safety hook 20 (in the leftward direction), and accordingly, clockwise rotation of the safety hook 20 about the first pin 70 may be suppressed. Thus, the pawl 30 may hold the safety hook 20 to allow the hook portion 21 of the safety hook 20 to block the entrance of the first locking slot 11.

In addition, in the locked state as illustrated in FIGS. 3 and 4, the second spring 60 may be coupled to one side of the base 10 and to the claw 40 while being extended in the transverse direction. Therefore, the second spring 60 may store an elastic force in the extended state. In the locked state as illustrated in FIGS. 3 and 4, when the user operates the switch 110 (e.g. a release lever), which is disposed within the cabin, the cable 100 may be pulled as illustrated in FIGS. 5 and 6. The force by which the cable 100 is pulled may be transmitted to the one end 31 of the pawl 30, and the pawl 30 may be rotated about the second pin 80 in the direction indicated by the arrow R1. When the pawl 30 is rotated about the second pin 80 in the direction indicated by the arrow R1, the locking protrusion 34 of the pawl 30 may be separated from the locking recess 42 in the claw 40. As a result, the locked state may be switched to the unlocked state.

As illustrated in FIGS. 5 and 6, even when the pawl 30 is rotated about the second pin 80 in the direction indicated by the arrow R1, the safety hook 20 may be maintained in contact with the one end 31 of the pawl 30. Accordingly, even in the unlocked state illustrated in FIGS. 5 and 6, the hook portion 21 of the safety hook 20 may continue to block the entrance of the first locking slot 11.

When the locking protrusion 34 of the pawl 30 is separated from the locking recess 42 in the claw 40 by the rotation of the pawl 30 and the locked state is thus released, as illustrated in FIGS. 5 and 6, the second spring 60, which has been extended in length, may be shortened in length by the restoring force thereof, as illustrated in FIG. 7. The restoring force of the second spring 60, by which the second spring 60 is shortened in length, may rotate the claw 40 about the third pin 90 in the direction indicated by the arrow R2. Due to the rotation of the claw 40 in the direction indicated by the arrow R2, the striker 2 may be raised (e.g., popped up) and released from the second locking slot 41.

The striker 2, which is released from the second locking slot 41 in the claw 40, may be caught by the hook portion 21 of the safety hook 20. Thereafter, when the user operates the lever portion 22 of the safety hook 20 to rotate the safety hook 20 about the first pin 70 in the direction indicated by the arrow R3, the first locking slot 11 in the base 10 may be opened. Subsequently, the user may lift the hood panel to pull the striker 2 out of the first locking slot 11.

As described above, the exemplary embodiment according to the present invention may include a structure in which both ends of the second spring 60 are coupled to the base 10 and to the claw 40. Accordingly, in the locked state as illustrated in FIGS. 3 and 4, the tensile force of the second spring 60 may be increased in proportion to the increased length to which the second spring 60 is extended. In addition, in the unlocked state as illustrated in FIGS. 5 and 6, the restoring force of the second spring 60 may be increased in proportion to the increased tensile force of the second spring 60. The increased restoring force of the second spring 60 may increase the rotation angle and rotating force of the claw 40, which may increase the distance to which the striker 2 is raised to be released from the second locking slot 41 when the locked state is released. The greater the distance to which the striker 2 is raised, the easier it may be for the user to lift the hood panel. As a result, working efficiency and the quality of the hood latch may be improved.

In the related art, a component, which operates as the second spring 60, is connected at both ends thereof to the pawl 30 and to the claw 40. This structure increases the force that the user is required to apply to operate the cable 100. Particularly, since the length to which the spring is extended in the locked state is short, the magnitude of restoring force that occurs when the locked state is released is minimal. Accordingly, the rotating force of the claw is minimal, and thus the distance to which the striker is raised is also minimal. Therefore, the hood latch of the related art has inferior quality. Conversely, as described above, the exemplary embodiment of the present invention may include a structure in which both ends of the second spring 60 are coupled to the base 10 and the claw 40, and therefore, the distance to which the striker 2 is raised may be increased. As a result, the quality of the hood latch may be improved.

In addition, the exemplary embodiment of the present invention may include a structure in which the one end 31 of the pawl 30 protrudes forward from the base 10 through the base 10 and in which the cable 100 is connected to the one end 31 of the pawl 30 that protrudes forward from the base 10. Accordingly, the user may first assemble the latch device, which is assembled into a unit, to the vehicle body member 1 (e.g., a front end module), and subsequently connect the cable 100 to the one end 31 of the pawl 30 that protrudes forward from the base 10. As a result, the user may connect the cable 100 more conveniently.

Furthermore, the exemplary embodiment of the present invention may include a structure in which the cable 100 is directly connected to the one end 31 of the pawl 30 that protrudes forward from the base 10. Accordingly, a separate cable bracket may be unnecessary for connection of the cable 100. As a result, the number of parts, the weight and manufacturing costs of the product may be decreased.

As is apparent from the above description, the present invention may provide the following effects. Since both ends of the second spring are coupled to the base and the claw, the tensile force of the second spring may be substantially increased in proportion to the increased length to which the second spring is extended in the locked state. In the unlocked state, the restoring force of the second spring may be substantially increased in proportion to the increased tensile force of the second spring. The increased restoring force of the second spring may increase the rotation angle and rotating force of the claw, which may increase the distance to which the striker is raised to be thus released from the second locking slot when the locked state is released. In addition, the greater the distance to which the striker is raised, the easier it may be for the user to lift the hood panel. As a result, working efficiency and the quality of the hood latch may be improved.

Furthermore, one end of the pawl may protrude forward from the base through the base, and the cable may be connected to the one end of the pawl that protrudes forward from the base. Accordingly, the user may first assemble the latch device, which is assembled into a unit, to a vehicle body member (e.g., a front end module), and subsequently connect the cable to the one end of the pawl that protrudes forward from the base. As a result, the assembler may connect the cable more conveniently. Moreover, since the cable may be directly connected to the one end of the pawl that protrudes forward from the base, a separate cable bracket for connection of the cable may be unnecessary. As a result, the number of parts, the weight and manufacturing costs of the product may be decreased.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A hood latch device for a vehicle, comprising:
   a base secured to a vehicle body member;
   a safety hook, a pawl and a claw, each of which is rotatably coupled to the base;
   a first spring coupled to the safety hook and to the pawl; and
   a second spring coupled to one side of the base and to the claw;
   wherein the first spring is a tension spring that provides an elastic force to the safety hook and the pawl to maintain the safety hook and the pawl in contact with each other in a locked state;
   wherein a first end of the first spring is coupled to one end of the pawl and a second end of the first spring is coupled to a predetermined portion of the safety hook;
   wherein a vertical position at which the second end of the first spring is coupled to the predetermined portion of the safety hook is higher than a vertical position at which the first end of the first spring is coupled to the pawl; and
   wherein a center of the second spring is disposed below a center of the first spring.

2. The hood latch device according to claim 1, wherein one end of the pawl penetrates the base and protrudes forward from the base, and wherein the one end of the pawl, that protrudes forward from the base, is connected with a cable.

3. The hood latch device according to claim 1, wherein one end of the pawl penetrates the base and protrudes forward from the base, and wherein the one end of the pawl, that protrudes forward from the base, is coupled with the first end of the first spring.

4. The hood latch device according to claim 1, wherein the base includes a guide aperture cut along a rotation path of the pawl, and wherein one end of the pawl protrudes forward from the base through the guide aperture formed in the base.

5. The hood latch device according to claim 1, wherein the second spring is a tension spring that is coupled to one side of the base and to the claw while being extended in a transverse direction, and wherein, when a locked state is released by rotation of the pawl, the claw is rotated by a restoring force of the second spring to raise a striker.

6. The hood latch device according to claim 1, wherein the safety hook is coupled to a front surface of the base via a first pin to be rotatable relative to the base, and wherein the pawl and the claw are coupled to a rear surface of the base via a second pin and a third pin, respectively, to be rotatable relative to the base and to be in contact with each other.

7. The hood latch device according to claim 6, wherein one end of the pawl protrudes forward from the base through the base and is disposed at a first side of the first pin,
   wherein the one end of the pawl at which the first end of the first spring is coupled is disposed at the first side of the first pin,
   wherein the predetermined portion of the safety hook at which the second end of the spring is coupled is disposed at a second side of the first pin, and
   wherein the vertical position at which the second end of the first spring is coupled to the safety hook is disposed at a higher vertical position than the vertical position at which the first end of the first spring is coupled to the pawl, with respect to the first pin.

8. The hood latch device according to claim 6, wherein the base includes a first locking slot into which a striker is inserted, the safety hook includes a hook portion for opening or closing an entrance of the first locking slot in response to rotation of the safety hook, the pawl includes a locking protrusion that protrudes toward the claw, and the claw includes a second locking slot into which the striker is inserted and a locking recess into which the locking protrusion of the pawl is inserted.

9. The hood latch device according to claim 7, wherein the second pin and the third pin are disposed above the first pin to be spaced apart from each other in a transverse direction, wherein the second spring is disposed above the first pin and below the second and third pins, and wherein a first end of the second spring is coupled to a portion of the base that is disposed outside the second pin and a second end of the second spring is coupled to a portion of the claw that is disposed outside the third pin while the second spring is extended in length in the transverse direction.

10. The hood latch device according to claim 8, wherein, when the locking protrusion of the pawl is inserted into the locking recess in the claw, the striker is concurrently inserted both into the first locking slot and into the second locking slot to maintain a locked state, and the second spring is coupled to one side of the base and to the claw while being extended in length in a transverse direction to store an elastic force.

11. The hood latch device according to claim 8, wherein, when the locking protrusion is separated from the locking recess in the claw by rotation of the pawl and the locked state is released, the claw is rotated by a restoring force of the second spring, and the striker is raised and released from the second locking slot.

* * * * *